Aug. 26, 1952          H. KIMBLE          2,608,501
METHOD OF AND APPARATUS FOR MAKING LINED PIPE
Filed Nov. 26, 1948          4 Sheets-Sheet 1
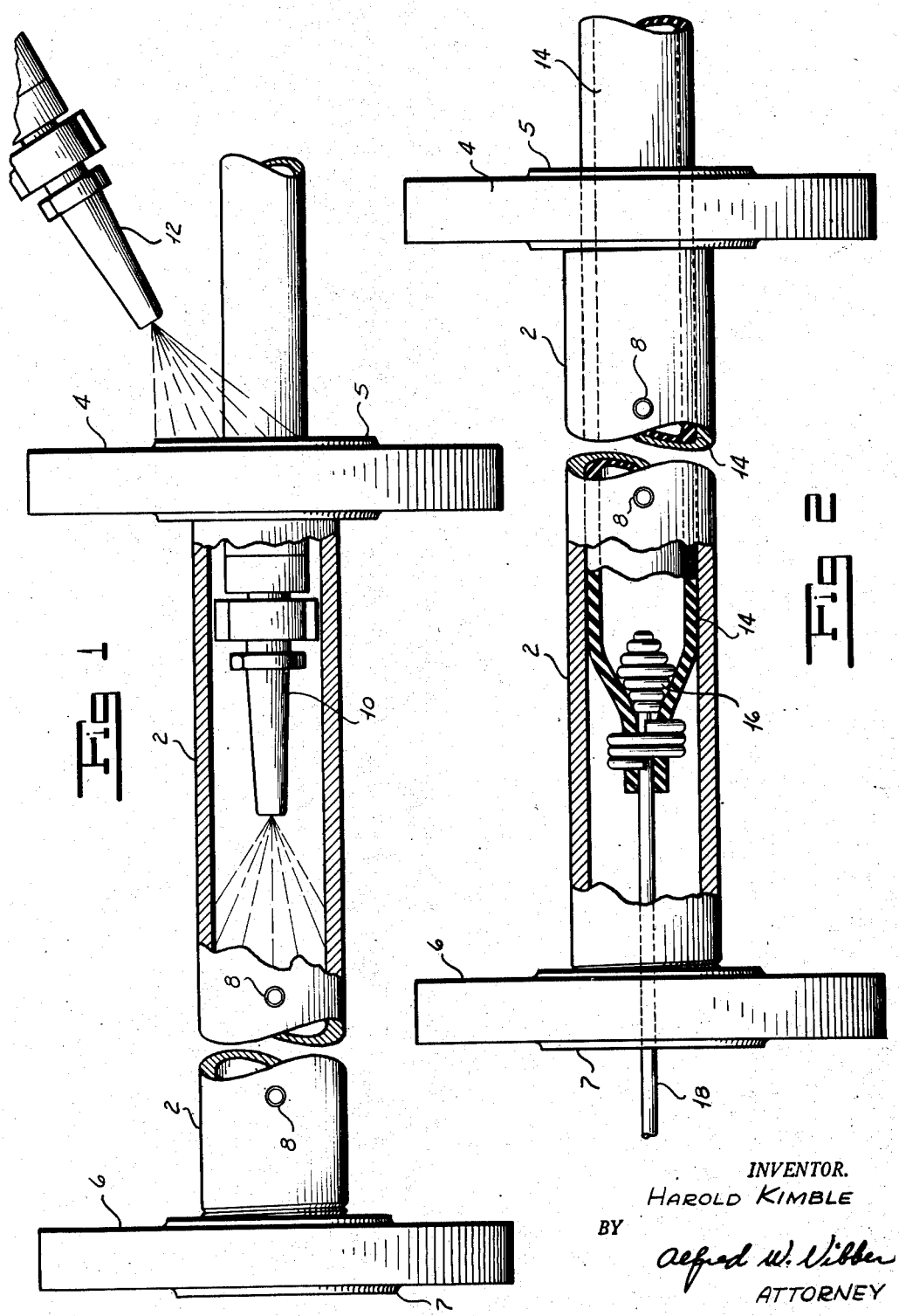
INVENTOR.
HAROLD KIMBLE
BY
ATTORNEY

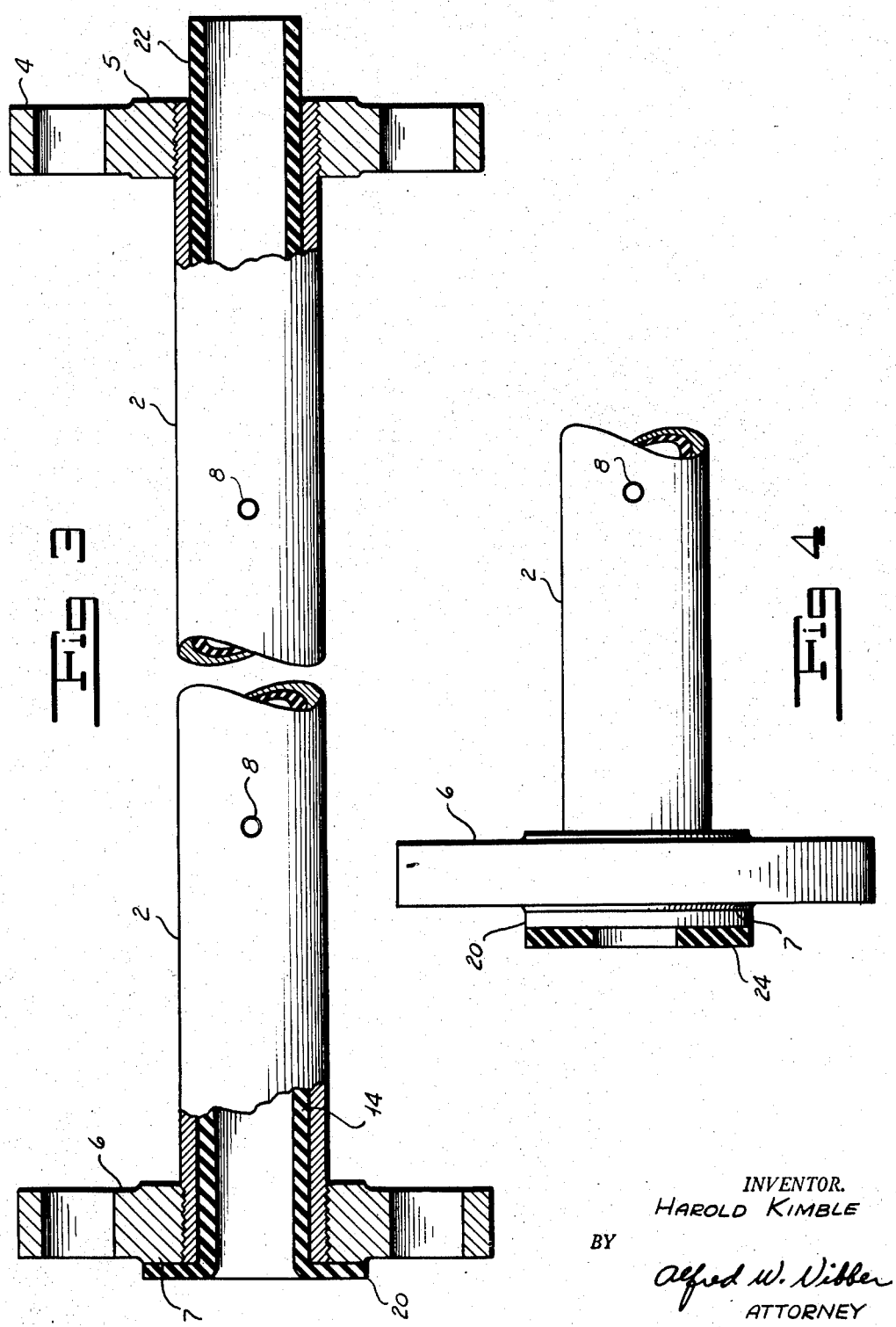

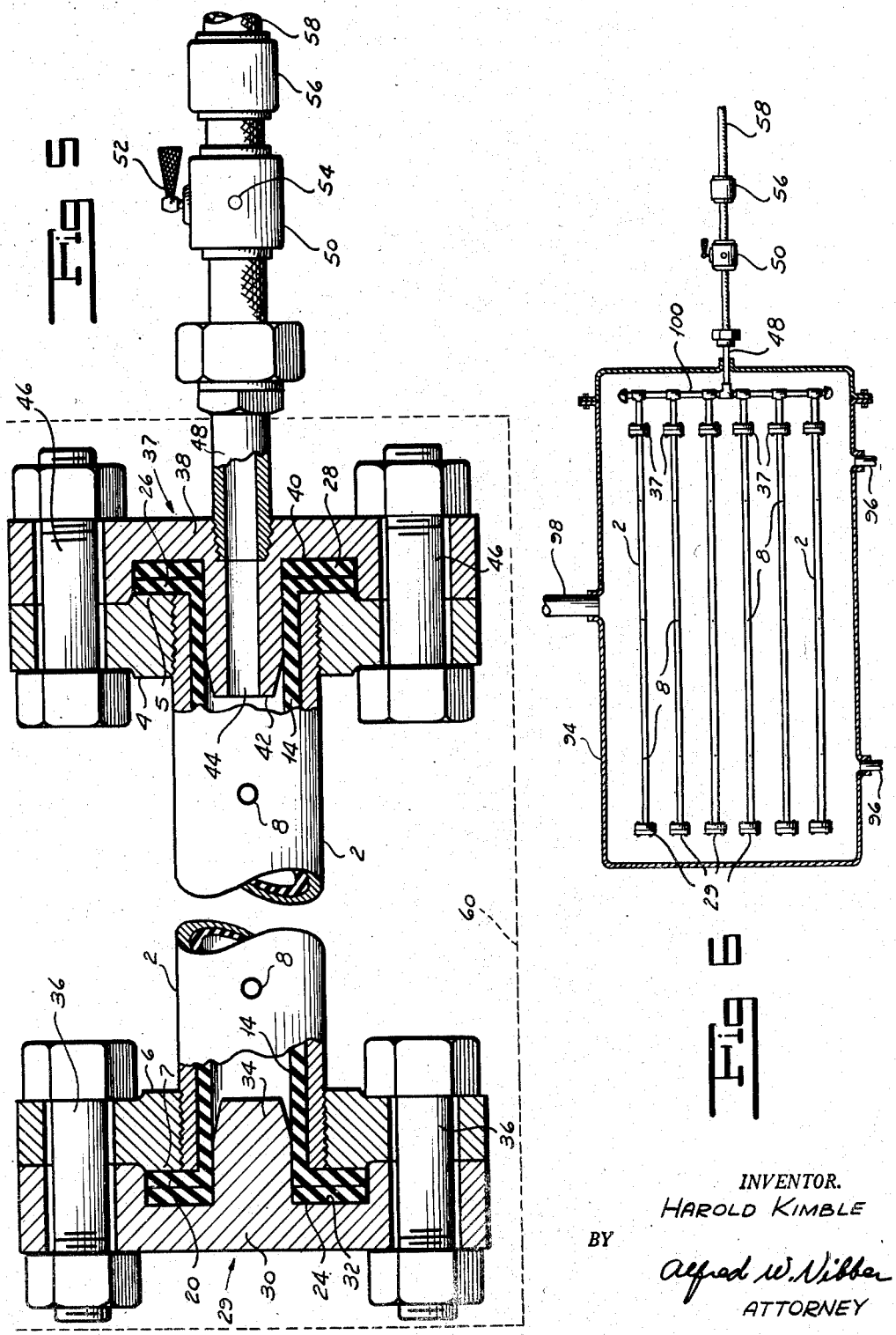

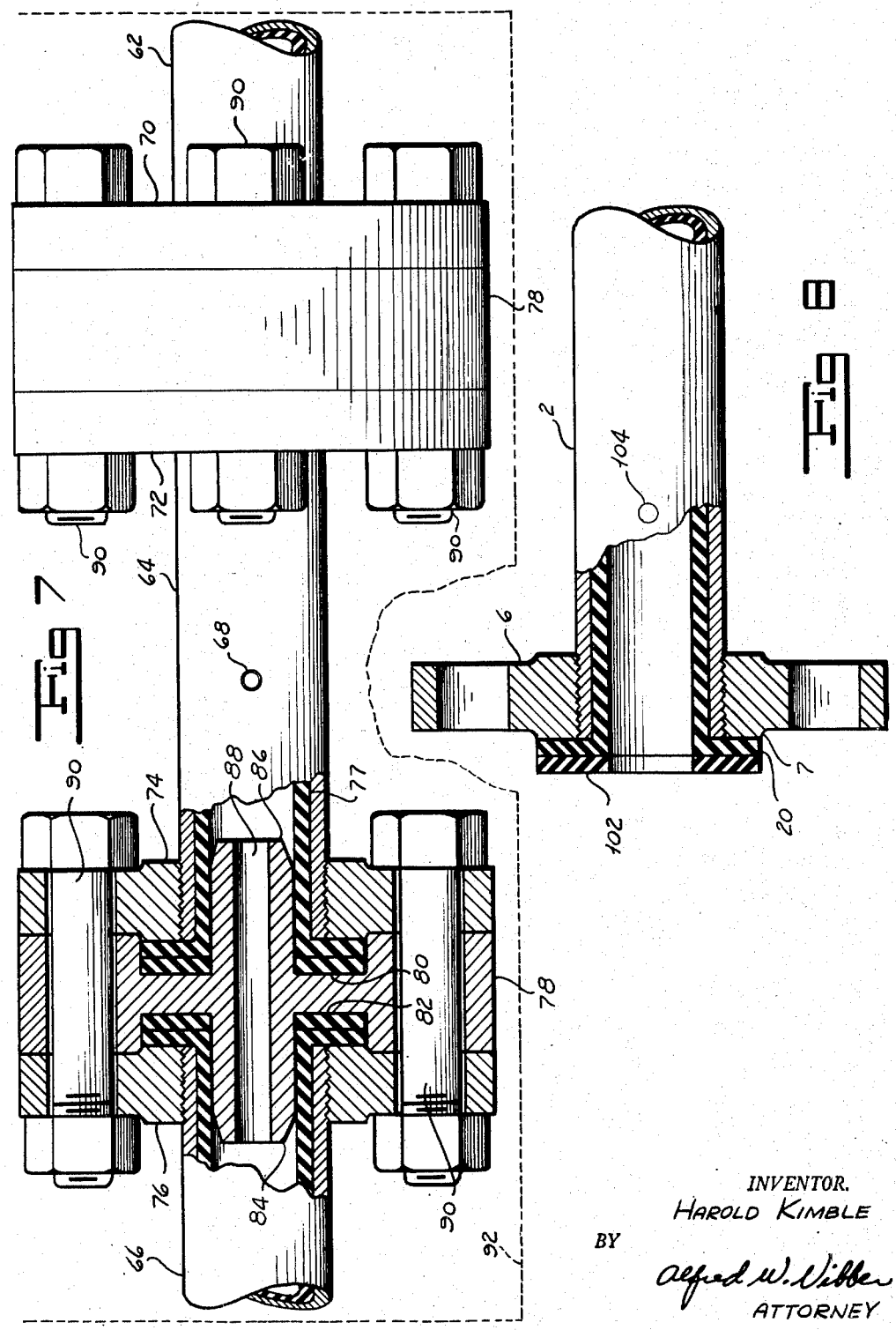

Patented Aug. 26, 1952

2,608,501

UNITED STATES PATENT OFFICE 2,608,501

METHOD OF AND APPARATUS FOR MAKING LINED PIPE

Harold Kimble, Midland Park, N. J., assignor to La Favorite Rubber Manufacturing Company, Hawthorne, N. J., a corporation of New Jersey Application November 26, 1948, Serial No. 61,981

10 Claims. (Cl. 154—82)

This invention relates to a hollow article such as a pipe lined with a heat curable elastomer, to the method of making such lined hollow article, and to apparatus employed in the lining of such article.

The invention has among its objects the provision of a novel method of making hollow articles, such as pipes or pipe fittings, lined with a heat curable elastomer whereby the bonding between the hollow article and the lining entirely over the interface therebetween is assured.

The invention has as a further object the provision of a method of making lined hollow articles of the type above described, such articles employing at least one end flange, the method involving the making of the covering for at least the central portion of the flange integral with the lining, such flange covering portion having desired predetermined characteristics in the cured state whereby it may function as a gasket.

A further object of the invention resides in the provision of a novel apparatus for forming or molding the lining and the flange covering portion thereof during the curing of the elastomeric lining and flange covering material.

Yet another object of the invention resides in the provision of apparatus whereby hollow articles such as pipes or pipe fittings may conveniently be treated in multiple to cure the lining and flange covering material.

A still further object of the invention resides in the novel lined hollow article resulting from practice of the method of the invention, the lined hollow article being characterized by the completeness of the bond between the hollow article and the lining therein and, in a preferred embodiment, also by the novel flange covering portion of the lining which enables the hollow article to be joined to other similar articles without the use of a separate gasket.

These and further objects of the invention will be more readily apparent in the following description of preferred embodiments of the method, apparatus, and lined hollow article in accordance with the invention.

Hollow articles, such as pipe, pipe fittings, and the like, made of conventional structural materials, such as steel, have heretofore been lined with material such as rubber to prevent contact between corrosive liquids carried by the pipe and fittings and the main bodies of such articles. Such lined hollow articles are used, for example, in the chemical industries, in the handling of acids, and in mines where the water to be pumped therefrom is frequently acid. Such lined pipes and fittings, however, have not been altogether satisfactory because of the incompleteness of bonding between the lining and the main body of the article, both in the interior of the article and at the end flanges when such are used. Furthermore it has been necessary, in order to secure a tight joint between the flanged ends of such articles, to employ a separate gasket member which is disadvantageous since such gasket may be lost or injured before assembly thereof in the pipe line.

The present invention provides lined hollow articles, such as pipes and pipe fittings, which overcome the above difficulties in that the bond between the hollow article and the lining is complete over the entire interface including the flanged outer end of the lining and the flange on the article. Further, in a preferred embodiment, the portion of the lining which covers at least the central portion of the flange on the article, while integral with the lining in its finally cured condition, may have characteristics different therefrom in its outer annular zone so that it, itself, functions as a gasket and obviates the provision of a separate gasket member.

The present invention effects such results by providing ideal bonding conditions between the interior surface of the hollow article and the applied lining layer, provides means of ready egress for the air which otherwise would be trapped between the inner surface of the main body of the hollow article and the applied lining layer, and forms the flange covering portion of the lining at the end thereof simultaneously with the pressing of the lining layer against the hollow article during the curing of the former. In addition, in a preferred embodiment, the flange covering portion of the lining is provided in its outer annular zone with an elastomer of different composition from that of the main lining portion, so that when cured the main lining portion functions to perform its designed purpose of resisting corroding and abrading media, whereas the outer annular zone of the flange covering portion functions primarily as a sealing member.

The invention will be more readily understood by reference to the accompanying drawings in which:

Figure 1 is a somewhat schematic, fragmentary view, partially in side elevation and partially in axial section, of a pipe to be lined while undergoing preliminary, surface cleaning, operations;

Figure 2 is a similar view of the pipe to be lined depicting a further step in the method, the lining being shown in the process of being introduced within the pipe;

Figure 3 is a fragmentary view, partially in side elevation and partially in axial section, of the pipe of Figures 1 and 2 after the lining has been fully introduced therewithin and the forward end of the lining has been flanged;

Figure 4 is a fragmentary view in side elevation of the pipe of Figure 3 after an annular elastomeric member has been applied to the outer face of the flanged end of the lining, such annular member being shown in axial section;

Figure 5 is a somewhat schematic fragmentary view, partially in plan and partially in axial section, of the lined pipe and the flange covering portions of the lining, the flanges on the pipe having assembled therewith apparatus to mold the flange covering portions of the lining and to press such portions and the lining in contact with the flanges and the pipe during the curing of the lining;

Figure 6 is a somewhat schematic view partially in plan and partially in horizontal section showing apparatus for curing the linings of a plurality of sections of lined pipe connected in parallel;

Figure 7 is a view partially in plan and partially in axial section of an assembly of a plurality of lined pipe nipples and molding apparatus for the flange covering portion of the lining which permits the sequential connection of the nipples and the curing of their linings in multiple; and Figure 8 is a fragmentary view partially in side elevation and partially in vertical section of the embodiment of the lined pipe of the invention in which the outer annular zone of the flange covering portion of the lining is designed to function as a sealing gasket.

In Figures 1, 2, 3, 4, and 5 there are depicted certain operations performed in the making of a lined pipe in accordance with the invention. The pipe 2, which, in this instance, is made of steel, is threaded on both ends and has mounted thereon the end flanges 4 and 6, such flanges having respectively the raised central annular portions 5 and 7, respectively. To provide means of escape for the air which otherwise would be trapped between the lining and the interior of the tube the pipe is provided throughout its length with a series of holes 8, which are most conveniently formed therein before the flanges are applied to the pipe. For the standard 20′ length of pipe it is preferred to provide three such holes spaced uniformly from the ends of the pipe and from each other. When a pipe 6′ or less in length or a short pipe fitting is involved, generally but one such hole in the longitudinal center thereof is sufficient. Holes 8 are of substantial diameter, ⅛ in. being typical when the pipe 2 is, for example, 4″ in diameter. Holes 8 are tapped for the subsequent reception of plugs, as will be described below.

The internal surface of the pipe is then thoroughly sandblasted as by means of the sandblast nozzle 10 inserted therein, the sandblast removing scale, rust, and grease from such surface as well as roughening it at least slightly. The central raised portions of the flanges 5 and 7 are likewise subjected to sandblasting, the nozzle 12 being depicted in such operation. After being sandblasted, the central portions of the flanges likewise are thoroughly clean and in slightly roughened condition, ideal for the bonding thereto of the lining material. A blast of clean air is then directed against the outer faces of the flanges and also interiorly of the pipe to remove therefrom any dust which may remain from the sandblasting operation.

The cylindrical tubular lining member 14 is, in this instance, formed by cutting a strip of suitable width from a sheet of uncured elastomer of the desired composition, such strip being skived at both its longitudinal edges and then being wrapped longitudinally about a mandrel of suitable diameter, the skived edges of the strip which overlap and lie longitudinally of the mandrel being thoroughly knitted together by a conventional rolling operation. The tube 14 of lining material so produced, which has an outer diameter slightly less than the inner diameter of the pipe to be lined, is then stripped from the mandrel. There is then mounted in one end of the tube a snake 16 provided with a snake wire 18. The lining 14 is then snaked into the pipe in the manner shown in Figure 2. Lining 14, which is of a length somewhat exceeding the length of pipe 2, is left in the position shown in Figure 3 in which a sufficient length of the lining protrudes from either end of the pipe so that when such protruding portion is flanged it will cover the raised central portion on the outer face of each flange.

When the lining has been so located in the pipe the snake is disconnected from its forward end. A coating of bonding material such as rubber cement is then applied to the outer raised faces of flanges 4 and 6, after which the protruding ends of the lining 2 are stretched and flanged to cover such raised portions of the flanges on the pipe. In Figure 3 the protruding end of the lining at the left-hand end of the pipe is shown as having been stretched to form the flange 20, whereas the protruding portion 22 of the lining at the right-hand end of the pipe has not as yet been flanged. The outer radial face of each of the resulting flanged ends of the lining is then cleaned, as with benzine. To the outer face of each of the flanged ends of the lining is affixed an annular member likewise made of uncured, heat curable elastomer. The annular member at the left is designated 24; the face of member 24 in contact with the outer radial face of flange 20 is likewise cleaned with benzine before such assembly. When two thus cleaned uncured elastomers are firmly pressed together, they remain affixed to each other sufficiently firmly to allow the application of the molding apparatus to the flange of the article without having the annular member slip or fall off. At the right-hand end of the pipe, as shown in Figure 5, a similar annular sealing member 28 is shown as having been similarly affixed to the outer radial face of the flanged end 26 of the lining formed from protruding end 22 thereof.

Flange molding apparatus, generally designated 29, is then affixed to the flange at one end of the pipe, such apparatus also closing the pipe and the lining at that end, and flange molding apparatus, generally designated 37, which also seals the pipe at the other end but allows access of gas under pressure to the interior of the lining therethrough, is affixed to the flange at the other end of the pipe. The molding apparatus 29 consists of a plate-like closure member 30 which, in this instance, has the same diameter as the flange 6 on the pipe. Member 30, which is mounted parallel to and in contact with flange 6, in which position it is held by a series of bolts 36 passing through the flange and the outer portion of member 30, has a flange molding annular cavity 32 on its face which confronts flange 6. Cavity 32 is coaxial with the pipe 2 and with members 6 and 30 and is designed snugly to receive portions 20 and 24 of the flanged end of the lining as well as accurately to interfit with the outer peripheral surface of the raised portion 7 on flange 6. Member 30 also carries on the face thereof, confronting flange 6, a short mandrel 34 located coaxial with pipe 2, flange 6, and member 30. Member 34, the inner end of which is tapered, as shown, for ease of insertion within the lining in the pipe, has the diameter of its rear portion closely approximating the inner diameter of the lining 14.

The molding apparatus 37 consists of a plate-like member 38 secured to flange 4 in parallel contacting relationship therewith by means of the bolts 46. Member 38 has on its face which confronts flange 4 an annular cavity 40 which snugly receives members 26 and 28 forming the flanged end of the lining and which accurately embraces the peripheral surface of raised portion 5 on flange 4. Member 38 carries on its inner face the short hollow mandrel 42, such mandrel having the bore 44 axially therethrough. Member 38 has a threaded central opening, as shown, communicating with bore 44 in the mandrel 42, such threaded opening receiving the pipe 48 by means of which gas under pressure is led to the interior of the lining within the pipe.

In Figure 5 the assembly thus far described is shown located within a vulcanizing oven schematically indicated by the dash line 60. Such oven may be any conventional vulcanizing closure such as a kiln or autoclave which operates to raise its contents to a predetermined vulcanizing temperature. Pipe 48 which protrudes through the wall of oven 60 is connected to a source of gas pressure (not shown) through the medium of pipe 58, pressure regulating valve 56, and the shut-off and bleeder valve 50, which is shown provided with an operating handle 52, and a bleeder port 54. Valves 56 and 50 are of conventional design, valve 56 being adjustable to maintain a selected predetermined pressure therethrough which is at least slightly less than the pressure at which the gas is supplied to it. Valve 50 is a two-position valve in one of which positions gas flows therethrough into pipe 48, port 54 being closed, and in the other position gas from the source being shut off from pipe 48 and the gas in pipe 48 being bled through port 54.

With the pipe assembled in the molding and gas supplying apparatus, as shown in Figure 5, the lining of the pipe is first subjected to a preliminary expansion by opening valve 50 to subject the lining to the pressure of the gas determined by valve 56. Valve 50 is then closed to release the pressure upon the interior of the lining, which allows the lining to readjust itself, if necessary. The interior of the lining is then subjected to gas pressure for a second time by opening valve 50, after which the vent holes 8 are closed by inserting plugs tightly therein. The assembly is then subjected to heat within the closure 60, such heat preferably being dry heat. During such vulcanizing cycle the interior of the lining is maintained under gas pressure, valve 56 functioning to maintain such pressure constant in spite of the heating of the gas within the lining of the tube. After the pipe has been heated for a predetermined length of time at its curing temperature, it is cooled rapidly to atmospheric temperature. Valve 50 is then closed to shut off the gas pressure and to bleed the pipe 2, after which members 30 and 38 of the flange molding apparatus are removed and the heads of the plugs inserted in the vent openings 8 are ground off flush with the surface of the pipe. One such ground off plug is shown at 104 in Figure 8.

In Figure 6 an arrangement is shown whereby a plurality of assemblies such as shown in Figure 5 may be vulcanized at one time. Here there is shown a vulcanizing oven 94 provided with inlets 96 for heated air on one side of the oven and an exhaust stack 98 on the other side of the oven. Pipe 48, in this instance, connects with a manifold pipe 100 to which are connected a plurality of assemblies consisting of lined flanged pipes, the molding apparatus 29 at the closed end of each, and the molding apparatus 37 at the gas admitting end of each.

In Figure 7 there is shown apparatus whereby a plurality of short, lined hollow articles, such as pipe fittings, may be sequentially connected and cured in multiple. In Figure 7 three pipe nipples 62, 64, and 66 are shown so connected. Nipple 62 is provided with a flange 70, nipple 64 with flanges 72 and 74, and nipple 66 with a flange 76. Each nipple is provided with a vent hole, only that hole designated 68, centrally located in nipple 64, being shown.

The flange molding apparatus of the embodiment shown in Figure 7 includes a plate-like member 78 of the same diameter as the flanges on the ends of the nipples and adapted for mounting between the flanges of adjacent nipples in parallel contacting relationship therewith. A member 78 is held between flanges 70 and 72, at the right in Figure 7, and between flanges 74 and 76, at the left in Figure 7, in each instance by bolts 90 passing through the flanges and the member. Member 78 is provided on each of its faces with a central annular recess for molding the flanged end of the lining 77 and its applied annular member. The recess at the right of the member 78 shown in section in Figure 7, such recess being positioned coaxial with the nipples and with the flanges thereof, is designated 80, and that at the left is denoted 82. Each of the faces of member 78 is provided with a longitudinally directed mandrel coaxial with the nipples, that at the right being designated 86, and that at the left being designated 84. Each of such mandrels has an outer diameter such that it closely engages the lining of the nipples near the ends thereof. A longitudinal passage 88 is provided through both mandrels and through the central portion of member 78 between the mandrels.

With the molding apparatus shown in Figure 7 a plurality of small pieces of pipe or a plurality of pipe fittings may have their linings cured at one time, thus effectively using the space in the curing oven schematically indicated by the dash line at 92. Gas will be admitted to the assembly in the manner shown in Figure 5, that is, a gas admitting molding means 37 will be employed at one end of the connected string of fittings and a closure molding member 29 will be employed at the other end of the string of fittings.

The invention is capable of use to advantage when employing any one of the numerous known heat curable elastomers as the lining material for the hollow article. The type of elastomer used and the compounding and treatment thereof before formation of the lining therefrom depend upon what use is to be made of the lined article. As an example of the elastomers which may be employed for the lining, the following are cited. It is to be understood that such list is illustrative only and not exhaustive: natural rubber; neoprene, which is polymerized chloroprene made by polymerization on chloroprene in emulsion; Buna S, which is copolymerized butadiene and styrene; Perbunan, which is copolymerized butadiene and acrylonitrile in an aqueous solution; butyl, which is a copolymer of a butene and a diolefin; and Thiokol, which is an organic polysulfide.

Ordinarily, in order to make the lining desirably resistant to abrasion, the elastomer employed for making such lining is compounded and treated in a manner conventional in the rubber working art such that when cured in the pipe the lining will have a hardness in the neighborhood of 95 on the A scale of the Shore durometer. When the annular members, such as 24 and 28, placed on the outer radial face of the flanged end of the lining are not to be relied upon as the sealing means between connected pipes, such annular members will ordinarily have the same composition as, and thus will cure to the same hardness as, the lining proper upon being vulcanized. In Figures 5 and 7 the applied annular members are indicated as being of the same composition as and, in effect, a part of the lining proper.

When, however, in accordance with the preferred embodiment shown in Figure 8, the annular member 102 applied to the flanged end of the lining is to function as a gasket, the stock from which such member 102 is blanked is compounded and treated so that it cures to a markedly softer condition than the main portion of the lining 14 and its flanged end 20 although upon vulcanization it bonds to and, in effect, becomes an integral part of the flanged end 20. Ordinarily, a material so compounded and treated that when fully vulcanized it cures to a hardness in the neighborhood of 60 on the A scale of the Shore durometer will be satisfactory for forming member 102.

Because of the care in the preparation of the surfaces of the article to which the lining and covering elastomer is to be bonded as well as the manner of pressing such elastomer into contact with the article before and during the curing cycle, the elastomer is bonded to the article over the entire interface between them. The vent holes through the wall of the article allow the escape of all the air which was trapped between the article and lining after the insertion of the latter. The first inflation, the release of pressure on the lining, and the subsequent application of pressure which persists throughout the curing cycle are efficacious in both removing such air and also in conforming the lining to the hollow article and pressing it intimately into contact therewith.

The use of a gas thus to press the lining into contact with the article, the heating of the article being conducted from the outside thereof, is advantageous since it eliminates the possibility of contact between a corrosive heating medium and the surfaces of the article to which the elastomeric material is desired to be bonded. Such possibility exists in prior art pipe lining methods which employ a heating medium such as steam or a solution of a salt in water as both the lining inflating and the heating agent to effect curing of the lining, especially in the early stages of such prior processes, when the seam of the lining may not be absolutely fluid tight, as before it has been initially internally subjected to internal pressure.

Whereas for purposes of illustration I have disclosed preferred methods of forming lined hollow articles such as pipes and the like with heat curable elastomeric materials, apparatus for carrying out such method, and the lined hollow article such as a pipe resulting from such method, it is to be understood that such embodiments are illustrative only and that the invention is capable of considerable variation as to details. The invention is therefore to be defined by the scope of the claims appended hereto.

I claim as new the following:

1. The method of lining an elongated hollow article having a passage therethrough and a transverse flange on one end thereof with a layer of a heat curable elastomer impervious to gas which comprises providing at least one vent hole through the wall of the article and spaced from the ends thereof, inserting in the article a lining in the form of a continuous layer of uncured elastomer of cylindrical shape generally conforming to the size of the passage in the article and of a length substantially exceeding that of the article, the lining being inserted in the article so that a substantial length thereof protrudes from the article at the flanged end thereof, flanging the protruding end of the lining at such flanged end of the article to bring it into contact with the external radial face of the flange on the article, inflating the lining with gas admitted thereto under pressure to force the lining into intimate contact with the wall of the passage in the article to expel air from between the lining and the wall of the passage in the article, pressing the flanged portion of the lining into intimate contact with the external radial face of the flange on the article, and while the lining is inflated by such gas and the flanged portion of the lining is pressed against the external radial face of the flange on the article closing the vent hole in the wall of the article and heating the article to a predetermined temperature for a predetermined time to cure the lining and to bond it to the inner wall of the article and to the outer face of the flange of the article.

2. The method of lining an elongated hollow article having a passage therethrough and a transverse flange on each end thereof with a layer of a heat curable elastomer impervious to gas which comprises providing at least one vent hole through the wall of the article and spaced from the ends thereof, inserting in the article a lining in the form of a continuous layer of uncured elastomer of cylindrical shape generally conforming to the size of the passage in the article and of a length substantially exceeding that of the article, the lining being inserted in the article so that a substantial length thereof protrudes from the article at both ends thereof, flanging the protruding end of the lining at a first end of the article to bring it into contact with the external radial face of the flange on the article at such first end of the article, similarly flanging the protruding end of the lining at the second end of the article to bring it into intimate contact with the external radial face of the flange on the article at such second end of the article, inflating the lining with gas admitted thereto under pressure to force the lining into intimate contact with the wall of the passage in the article to expel air from between the lining and the wall of the passage in the article, pressing the flanged portions of the lining into intimate contact with the external radial faces of the flanges on the article, and while the lining is inflated by such gas and while the flanged portions of the lining are pressed against the radial faces of the flanges on the article closing the vent hole in the wall of the article and heating the article by applying a heating medium solely to the elongated hollow article and to the flange molding devices secured to such article to cure the lining and to bond it to the inner wall of the article and to the outer faces of the flanges of the article.

3. The method of lining an elongated hollow article having a passage therethrough and a transverse flange on each end thereof with a layer of a heat curable elastomer impervious to gas which comprises providing at least one vent hole through the wall of the article and spaced from the ends thereof, inserting in the article a lining in the form of a continuous layer of uncured elastomer of cylindrical shape generally conforming to the size of the passage in the article and of a length substantially exceeding that of the article, the lining being inserted in the article so that a substantial length thereof protrudes from the article at both ends thereof, flanging the protruding end of the lining at a first end of the article to bring it into contact with the external radial face of the flange on the article at such first end of the article, similarly flanging the protruding end of the lining at the second end of the article to bring it into intimate contact with the external radial face of the flange on the article at such second end of the article, applying an annular member of an uncured elastomer to each flanged end of the lining, inflating the lining with gas admitted thereto under pressure to force the lining into intimate contact with the wall of the passage in the article to expel air from between the lining and the wall of the passage in the article, pressing the flanged portions of the lining into intimate contact with the external radial faces of the flanges on the article and pressing the annular members of an uncured elastomer into intimate contact with the confronting external radial faces of the thus flanged portions of the lining, and while the lining is inflated by such gas while continuing the pressing of the flanged portions of the lining against the external radial faces of the flanges on the article and the applied annular members of uncured elastomer are pressed against the confronting outer faces of the flanged portions of the lining closing the vent hole in the wall of the article and heating the article by applying a heating medium solely to the external surfaces of the elongated hollow article and of the flange molding devices secured to such article to cure the lining and the applied annular members, and to bond the lining to the inner wall of the article and the flanged ends of the lining to the outer faces of the flanges of the article.

4. The method of lining an elongated hollow article having a passage therethrough and a transverse flange on each end thereof with a layer of a heat curable elastomer impervious to gas which comprises providing at least one vent hole through the wall of the article and spaced from the ends thereof, inserting in the article a lining in the form of a continuous layer of uncured elastomer of cylindrical shape generally conforming to the size of the passage in the article and of a length substantially exceeding that of the article, the lining being inserted in the article so that a substantial length thereof protrudes from the article at both ends thereof, flanging the protruding end of the lining at a first end of the article to bring it into contact with the external radial face of the flange on the article at such first end of the article, similarly flanging the protruding end of the lining at the second end of the article to bring it into intimate contact with the external radial face of the flange on the article at such second end of the article, applying an annular member of an uncured elastomer to each flanged end of the lining, the annular members each being made of material which cures to a softer condition than the lining, inflating the lining with gas admitted thereto under pressure to force the lining into intimate contact with the wall of the passage in the article to expel air from between the lining and the wall of the passage in the article, pressing the flanged portions of the lining into intimate contact with the external radial faces of the flanges on the article and pressing the annular members of an uncured elastomer into initimate contact with the confronting radial external faces of the flanged ends of the lining, and while the lining is inflated by such gas while continuing the pressing of the flanged portions of the lining against the external radial faces of the flanges on the article and the pressing of the applied annular members of an uncured elastomer against the confronting external radial faces of the thus flanged portions of the lining closing the vent hole in the wall of the article and heating the article by applying a heating medium solely to the external surfaces of the elongated hollow article and of the flange molding devices secured to such article to cure the lining and the applied annular members, and to bond the lining to the inner wall of the article and the flanged ends of the lining to the outer faces of the flanges of the article.

5. Apparatus for molding the flanged outer end of a lining made of an elastomer in a hollow article having a transverse flange on one end, the flanged end of the lining at least partially overlapping the outer radial face of the flange on the article comprising a plate-like member of such size and shape as to span the outer face of the flange on the article, means to secure the member to the flange on the article in confronting parallel relationship therewith, the member having on its inner face when so mounted an annular recess generally coaxial with the passage in the article tightly to receive the flanged end of the lining and to press it against the outer radial face of the flange on the article, and a mandrel on the inner, flange confronting, face of the member and coaxial with the passage in the article, said mandrel extending into and intimately engaging the inner surface of the lining at the end of the article adjacent the flange thereon.

6. Apparatus for molding the flanged outer end of a lining made of an elastomer in an elongated hollow article having a transverse flange on one end, the flanged end of the lining at least partially overlapping the outer radial face of the flange on the article comprising a plate-like member of such size and shape as to span the outer face of the flange on the article, means to secure the member to the flange on the article in confronting parallel relationship therewith, the member having on its inner face when so mounted an annular recess generally coaxial with the passage in the article tightly to receive the flanged end of the lining and to press it against the outer radial face of the flange on the article, and a mandrel on the inner, flange confronting, face of the member and coaxial with the passage in the article, said mandrel extending into and intimately engaging the inner surface of the lining at the end of the article adjacent the flange thereon, said mandrel having a passage therethrough longitudinally thereof, the plate-like member having a passage therethrough communicating with the passage in the mandrel, and a gas conducting conduit connected to the plate-like member in communication with the passage in the latter.

7. Apparatus for simultaneously molding the flanged outer ends of the uncured elastomeric lining of each of two serially connected lined hollow articles, such articles each having a transverse flange at their confronting ends, the flanged end of the lining in each article at least partially overlapping the outer radial face of the flange on such article comprising a plate-like member of such size and shape as to span the outer faces of the flanges on the two articles, means to secure the member and the flanges on the articles together in parallel coaxial relationship with the member between the flanges, the member having on each broad, flange confronting, face thereof an annular recess generally coaxial with the passage of the article which it confronts tightly to receive the flanged end of the lining and to press it against the outer radial face on the flange on such article, and a mandrel on each broad flange confronting, face of the member and coaxial with the passage in the article which it confronts, said mandrel extending into and intimately engaging the inner surface of the lining at the end of the article which it penetrates.

8. Apparatus for simultaneously molding the flanged outer ends of the uncured elastomeric lining of each of two serially connected lined hollow articles, such articles each having a transverse flange at their confronting ends, the flanged end of the lining in each article at least partially overlapping the outer radial face of the flange on such article comprising a plate-like member of such size and shape as to span the outer faces of the flanges on the two articles, means to secure the member and the flanges on the articles together in parallel coaxial relationship with the member between the flanges, the member having on each broad, flange confronting, face thereof an annular recess generally coaxial with the passage of the article which it confronts tightly to receive the flanged end of the lining and to press it against the outer radial face on the flange on such article, and a mandrel on each broad flange confronting, face of the member and coaxial with the passage in the article which it confronts, said mandrel extending into and intimately engaging the inner surface of the lining at the end of the article which it penetrates, said mandrels and the plate-like member having a continuous gas conducting passage therethrough, said passage extending longitudinally of the mandrels.

9. The method of lining an elongated hollow article having a passage therethrough and a transverse flange on one end thereof with a layer of a heat curable elastomer impervious to gas, which comprises providing at least one vent hole through the wall of the article and spaced from the ends thereof, inserting in the article a lining in the form of a continuous layer of uncured elastomer of cylindrical shape generally conforming to the size of the passage in the article and of a length substantially exceeding that of the article, the lining being inserted in the article so that a substantial length thereof protrudes from the article at that end having the flange thereon, flanging the thus protruding end of the lining to bring it into intimate contact with the external radial face of the flange on the article, applying an annular member of uncured elastomer to such flanged end of the lining, such applied annular member having substantially the same configuration and size as the thus flanged end of the lining, inflating the lining with gas admitted thereto under pressure to force the lining into intimate contact with the wall of the passage in the article to expel air from between the lining and the wall of the passage in the article, pressing the flanged portion of the lining into intimate contact with the external radial face of the flange on the article and pressing the applied annular member of uncured elastomer into intimate contact with the confronting external radial face of the thus flanged portion of the lining; and, while the lining is inflated by such gas and the flanged portion of the lining continues to be pressed into intimate contact with the external radial face of the flange on the article and the applied annular member continues to be pressed into intimate contact with the external radial face of the thus flanged portion of the lining, closing the vent hole in the wall of the article and heating the article to cure the lining and the applied annular member and to bond the lining to the inner wall of the article and the flanged end of the lining to the outer face of the flange of the article and to the applied annular member.

10. The method of lining an elongated hollow article having a passage therethrough and a transverse flange on one end thereof with a layer of a heat curable elastomer impervious to gas, which comprises providing at least one vent hole through the wall of the article and spaced from the ends thereof, inserting in the article a lining in the form of a continuous layer of uncured elastomer of cylindrical shape generally conforming to the size of the passage in the article and of a length substantially exceeding that of the article, the lining being inserted in the article so that a substantial length thereof protrudes from the article at the flanged end thereof, flanging the thus protruding end of the lining at the flanged end of the article to bring it into intimate contact with the external radial face of the flange on the article, applying an annular member of an uncured elastomer to the flanged end of the lining; the thus applied annular member having a configuration and size substantially the same as that of the flanged end of the lining, the annular member being made of material which cures to a softer condition than the lining, inflating the lining with gas admitted thereto under pressure to force the lining into intimate contact with the wall of the passage in the article to expel air from between the lining and the wall of the passage in the article, pressing the flanged portion of the lining into intimate contact with the external radial face of the flange on the article and pressing the applied annular member into intimate contact with the external radial face of the thus formed flanged portion of the lining; and, while the lining is inflated by such gas and the flanged portion of the lining is continuously pressed into intimate contact with the external radial face of the flange on the article and the applied annular member is pressed into intimate contact with the external radial face of the thus formed flanged portion of the lining, closing the vent hole in the wall of the article and heating the article by applying heat solely to the external surfaces of the article and the flange thereof to cure the lining and the applied annular member and to bond the lining to the inner wall of the article and the flanged end of the lining to the outer face of the flanges on the article and to the applied annular member.

HAROLD KIMBLE.

REFERENCES CITED

The following references are of record in the file of this patent:

UNITED STATES PATENTS

| Number | Name | Date |
|---|---|---|
| 642,537 | Thoma | Jan. 30, 1900 |
| 1,404,320 | Roberts et al. | Jan. 24, 1922 |
| 1,721,838 | Semon et al. | July 23, 1929 |
| 2,113,728 | Harrison | Apr. 12, 1938 |
| 2,284,761 | Nathan | June 2, 1942 |
| 2,290,333 | Johnson | July 21, 1942 |
| 2,312,993 | Stephens | Mar. 2, 1943 |
| 2,343,225 | Pray et al. | Feb. 29, 1944 |
| 2,417,881 | Munger | Mar. 25, 1947 |
| 2,424,993 | Meister | Aug. 5, 1947 |
| 2,430,273 | Browning | Nov. 4, 1947 |
| 2,440,725 | Munger | May 4, 1948 |